United States Patent [19]

Gebhard

[11] Patent Number: 4,524,929
[45] Date of Patent: Jun. 25, 1985

[54] SHORT TAKE OFF JUMP MODE FOR AIRPLANE LANDING GEAR STRUTS

[75] Inventor: David F. Gebhard, Northport, N.Y.

[73] Assignee: Grumman Aerospace Corporation, Bethpage, N.Y.

[21] Appl. No.: 430,657

[22] Filed: Sep. 30, 1982

[51] Int. Cl.$^3$ ..................... B64C 25/26; B64C 25/60
[52] U.S. Cl. ............... 244/63; 244/102 SL; 244/102 SS; 244/104 FP
[58] Field of Search .............. 244/63, 100 R, 102 SS, 244/102 SL, 104 FP, 104 CS; 188/300, 322.21; 267/64.12; 60/636; 92/15; 91/41, 44

[56] References Cited

U.S. PATENT DOCUMENTS

| | | | |
|---|---|---|---|
| 1,068,165 | 7/1913 | Peterson | 244/63 |
| 1,745,081 | 1/1930 | Crumbaugh | 244/63 |
| 1,767,120 | 6/1930 | Canfield | 244/63 |
| 2,735,634 | 2/1956 | Fosness | 244/102 SS |
| 3,023,740 | 3/1962 | Samuel, Jr. et al. | 92/15 |
| 4,291,850 | 9/1981 | Sharples | 244/102 SS |
| 4,300,664 | 11/1981 | Helm et al. | 188/67 |

*Primary Examiner*—Trygve M. Blix
*Assistant Examiner*—Rodney Corl
*Attorney, Agent, or Firm*—Daniel J. Tick; Richard G. Geib

[57] ABSTRACT

A telescoping energy-dissipating oleo landing gear shock strut set which can provide both the main landing gear and forward landing gear function, and which is affixed to an airplane, is restrained in an unenergized, shortened condition. A high pressure gas charge is then provided between the extendible element of the strut and the element affixed to the airplane. Early in the takeoff run, the charge gas in the forward strut is released so as to jump the nose and rotate the airplane to a high angle of attack appropriate for takeoff. Subsequent to this rotation, but before the conventional takeoff speed is reached, the charge gas in each of the main struts is released to impart a vertical velocity to the entire airplane, thus jumping it into the air. Both the forward strut and main struts incorporate a hydraulic flow bypass function, so that the landing shock dissipation function does not compromise the aforesaid energy release. The struts also incorporate valves to discharge enough residual gas immediately at the end of the jump stroke so that the landing energy dissipation mode is not compromised.

21 Claims, 9 Drawing Figures

SHORT TAKE OFF JUMP MODE FOR AIRPLANE LANDING GEAR STRUTS

BACKGROUND OF THE INVENTION

The present invention relates to a short takeoff jump mode for airplane telescoping energy-dissipating oleo landing gear struts. More particularly, the invention relates to a method and a jump strut device resulting in early takeoff of an airplane or, alternatively, more airplane payload without ground roll increase.

In years past, various devices relating to vertically accelerating an airplane during its takeoff roll have been patented. Examples of these are shown by U.S. Pat. Nos. 1,254,898, 1,317,414 and 1,702,682 which suggest projecting separate takeoff struts downwardly to impact the ground and by extension raise the airplane into the air with rotation or extension of the struts, U.S. Pat. Nos. 1,068,165 and 1,767,120, which show the extension of the landing gear wheels, and U.S. Pat. No. 1,745,081, which pivots an undercarriage through an arc in order to raise the airplane from the ground, which is a major departure from standard design practice. These prior art teachings do not suggest very practical direct integration and use of the concept of jumping an airplane with the use of a telescoping, energy-dissipating oleo shock absorber. These prior art teachings rely on the landing gear which act like springs and temporarily store energy, but do not directly dissipate it.

In fact, efforts to provide short takeoff capability on recent airplane designs have focused on more thrust and/or tilted thrust from the propulsion system, and wings that lift more at low speeds, rather than improved landing gears. An exception to this is the use by the British Royal Navy of an inclined ramp on an aircraft carrier forward deck to launch the airplane in a trajectory which is initially upward.

An obvious problem with this ramp technique for an airplane operating on land is that the ramp must always be at the upwind end of the runway, and the downwind end of the runway must be unobstructed. Since shifting wind direction is a nearly omnipresent condition, the ramp must frequently be relocated.

Another obvious problem with this ramp concept is the loading of the airplane undercarriage mounting in an unfamiliar pattern, which can result in a requirement for extensive structural modifications with consequent cost and performance penalties.

A frequent problem during the takeoff run of a nose wheel airplane with a high ratio of engine thrust to airplane weight and a low wing is that the sum of the nose down thrust couple and airplane weight moment about the main wheel axis exceeds the available nose up aerodynamic control moment until a high speed is reached. Thus, the airplane cannot lift off the ground, even though it may have enough speed to generate adequate lift if the proper high angle of attack could be achieved.

The principal object of the present invention is to provide a short ground run or overload jump takeoff method and device for telescopic, energy-dissipating oleo airplane landing gear shock struts neither of which method nor device requires significant change in the landing gear installation, or the airplane structure, aerodynamics, or propulsion design, which does not involve departures from the standard stability and control flight envelope of the airplane, and which requires no elaborate ground-based equipment.

An object of the invention is to provide a method and device for increasing the angle of attack of the airplane at an early point in its takeoff roll to increase the lift and permit a shorter takeoff ground run or payload increase, which method requires no significant change in the landing gear installation, or the airplane configuration, structure, aerodynamics, or propulsion design, and which requires no elaborate ground-based equipment.

Another object of the invention is to couple to the telescoping, energy-dissipating oleo landing gear shock absorber of a state-of-the-art airplane a system for varying its gas pressure loading, to effect initial latching thereof, and thereafter to pressurize same to force rapid extension thereof upon release of the latch, with quick reversion to the shock dissipation mode, thereby to provide early takeoff or payload increase of the airplane.

Still another object of the invention is to provide a jump strut device of simple structure which reverts quickly to the shock dissipation mode and which provides a short takeoff or payload increase for an airplane via the telescoping, energy-dissipating oleo landing gear shock struts of the airplane.

Yet another object of the invention is to provide a jump strut device which is inexpensive in manufacture and maintained with facility and convenience, providing early takeoff or payload increase of an airplane.

Another object of the invention is to provide a jump strut device for short takeoff or increased payload of an airplane with efficiency, effectiveness, reliability and safety.

BRIEF SUMMARY OF THE INVENTION

In accordance with the invention, a method of providing a shortened takeoff ground run or, alternatively, a payload increase without an increase in takeoff ground run, for an airplane having telescoping, energy-dissipating oleo landing gear shock struts affixed to and extendible from the airplane, typically at both the forward position and near the center of gravity, comprises the steps of bleeding gas from the shock struts to collapse them, restraining the shock struts in an unenergized shortened condition, energizing the struts with compressed fluid, releasing the struts during the takeoff ground run whereby first the energy of the forward strut extends the telescoping portion of the strut from the airplane thereby jumping the nose of the airplane upward and increasing the angle of attack of the airplane to cause an increase in lift to aid in counteracting gravity effect. During this jump action, a bypass valve eliminates the energy dissipation function. Subsequent to the nose-up rotation, the same jump action of the struts near the center of gravity pushes the entire airplane upward. A sensing probe at the tail of the airplane initiates this sequence, which results in an initially upward, but downwardly curved, trajectory, which produces a generally upward centrifugal force. This trajectory is defined by continuously diminishing gravity effect due to the sum of any thrust lift, and the increasing wing lift caused by the substantial horizontal acceleration provided by the propulsion system. The airplane does not return to earth, and there is a substantial reduction in the takeoff ground run.

In accordance with the invention, a method of rotating an airplane early in the takeoff ground run to a high angle of attack which provides lift for early takeoff, the airplane having a telescoping energy-dissipating oleo shock strut affixed to and extendible from the forward portion of the airplane, comprises the steps of bleeding gas from the shock strut to collapse it, restraining the shock strut in an unenergized, compressed condition, energizing the strut with compressed gas, releasing the strut during the takeoff ground run whereby the energy of the strut extends the movable portion of the strut from the airplane thereby jumping the nose of the airplane upward, increasing the angle of attack at a point in the takeoff ground run where there is not sufficient speed to achieve this rotation by conventional pitch control means.

After the jump operation, residual pressurizing gas is vented off as necessary to provide the proper gas charge for the landing shock absorption function. Rolling shock attenuation during the takeoff ground run is provided by the landing gear tires.

The shock strut includes an upper cylinder affixed to the airplane and a piston cylinder coaxially mounted in said upper cylinder for movement in axial directions, the piston cylinder having a free end farthest from the airplane and mounting a landing wheel of the airplane in a manner whereby the wheel is at a first predetermined distance from the airplane when the shock strut is in compressed condition and is at a second predetermined longer distance from the airplane when the shock strut is in extended condition.

The upper cylinder includes an orifice and orifice support tube coaxially positioned in the piston cylinder. The piston cylinder includes a metering pin coaxially slidably mounted in the orifice support tube and orifice, and a check valve which permits fluid to bypass the orifice when the piston cylinder is moving away from the airplane, but limits fluid to flow through the orifice when the piston cylinder is moving toward the airplane.

The latching device comprises a lock ring, intermediate latch parts and a load release sleeve. The load release sleeve is coaxially positioned with the intermediate latch parts so that the lock ring is maintained in a radially expanded condition which locks the metering pin and the piston cylinder to the orifice support tube and the upper cylinder. Axial movement of the load release sleeve permits the intermediate latch parts to move so that the lock ring contracts radially, releasing the metering pin and the piston cylinder from the orifice support tube and the upper cylinder.

The shock strut further includes a valve for bleeding off any excessive gas after the jump stroke, which valve is in addition to the valve for introducing gas to the strut for the usual rebound strut extension common to telescoping, energy-dissipating oleo landing gear shock struts.

The shock strut may include a pressurizable volume connected to the strut gas chamber so that jump gas energy may be stored at a convenient and appropriate pressure.

The shock strut also includes a snubbing provision to cushion the otherwise sudden contact between the piston cylinder and the upper cylinder at the end of the jump stroke.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 1:
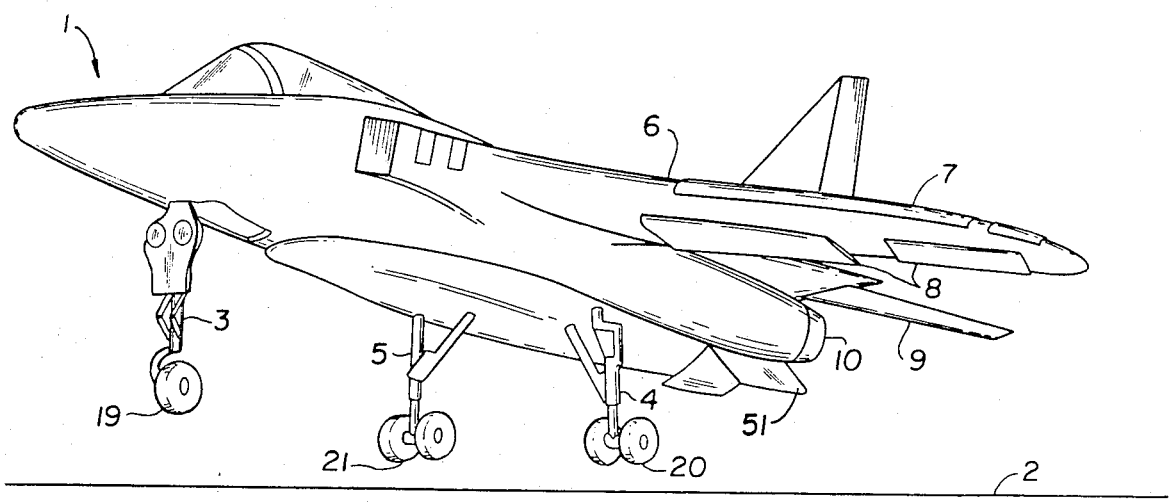
FIG. 1 is a perspective view of an airplane that has been jumped into the air during a takeoff roll in accordance with the invention.

A jet airplane 1 which has been jumped from a runway 2 during its takeoff roll by pressure within telescopic shock struts 3, 4 and 5 of the landing gear is shown in FIG. 1. The port wing 6 is shown with leading edge and trailing edge lift improvement means 7 and 8 being in the takeoff position. As shown in FIG. 1, the airplane 1 during the jump sequence is pitched nose up to increase the angle of attack of the wings. In order to assist this pitching, the airplane's movable elevator 9 is in a leading edge down attitude. Lift generation at low speeds may be further assisted by use of fixed tilt or variable tilt engine thrust nozzles, one of which 10 is shown on the airplane's port side. It is intended to seek, by cooperation of all aerodynamic devices and propulsion means, as well as by the early pitch up due to the nose gear jump and by the subsequent curved jump trajectory due to the main gear jump, to amplify the lift generation within the jump cycle.

Figure 2A:
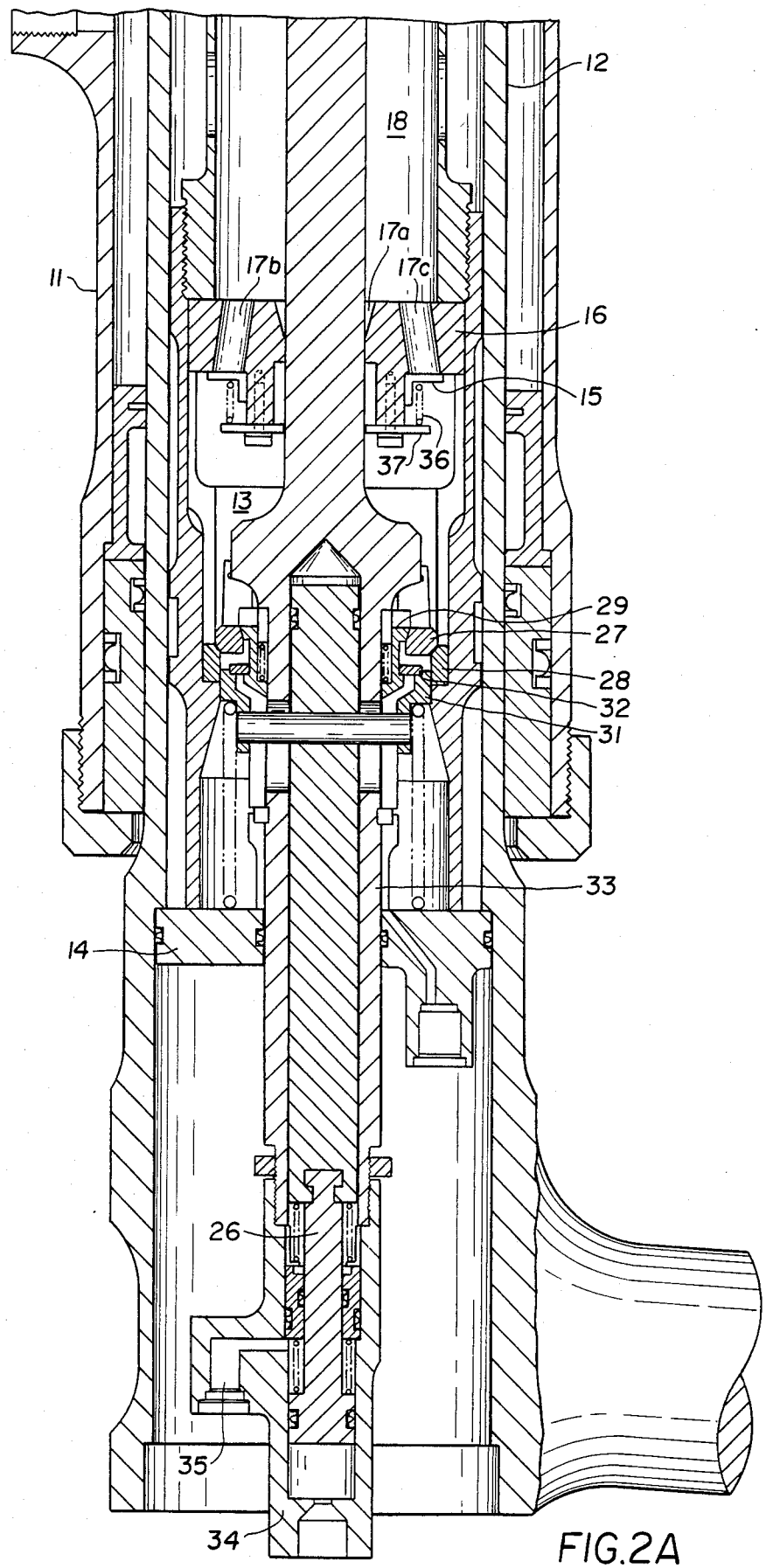
FIG. 2A is a sectional view of an embodiment of the jump strut device of the invention, in the latched condition, for effecting the jump shown in FIG. 1.

As shown in FIG. 2A, the aforedescribed jump technique is effected while retaining landing shock dissipation capability, thus achieving the dual mode strut of the invention. Each of the struts 3, 4 and 5 is designed to have a fixed upper cylinder 11 and a telescoping piston cylinder 12 with a cylindrical metering chamber 13 closed at its lower end by a cylinder end wall 14 and at its upper end by a check valve 15. The metering chamber 13 is provided with an orifice and support 16 and orifice 17a, which limits the fluid passage from one side of the device to the other, thus dissipating energy as the piston cylinder 12 telescopes into the upper cylinder 11. The orifice of the metering device is provided with a plurality of holes 17b, 17c, etc., for communication of its metering or inner chamber 13 with an upper chamber 18 of the shock struct (FIG. 2A). The check valve 15 precludes fluid flow limiting by the orifice by permitting flow through the holes 17b, 17c, etc., when the piston cylinder 12 extends from the upper cylinder 11 during the jump stroke.

As with any telescoping, energy-dissipating oleo shock absorber, it is filled with a liquid to a predetermined level and pressurized gas is introduced into the upper chamber 18 to normally maintain a non-loaded extension of the strut that will permit relative movement of the airplane wheels 19, 20 and 21 (FIG. 1) with respect to the airplane. The only variation to this telescoping, energy-dissipating oleo shock absorber concept in the invention is that, for the jump takeoff mode, the telescoping piston cylinder 12 may be latched with respect to the fixed cylinder 11 and the gas pressure and volume may be increased by a gas bottle, hereinafter described, and by charging a valve 22 and a shut-off valve 23 (FIG. 3) to contain enough energy so that, upon release of the latch, a suitable jump energy is imparted to the airplane. This is accomplished by the apparatus shown in FIG. 3, which apparatus includes a portable high pressure gas tank 24 of a volume much greater than the charge volume in the bottle 43 and the upper cylinder 11 required by a jump strut. A valve 25 controls the delivery of pressurized gas from the tank 24 to the interior of the gas bottle 43 and the upper cylinder 11.

The piston cylinder 12 and the upper cylinder 11 are provided with a latching device controlled by an actuator 26 to hold said piston cylinder in its maximum compressed attitude in accordance with the invention.

Any suitable latching device may be utilized such as, for example, that disclosed in U.S. Pat. No. 4,300,664, issued Nov. 17, 1981 to Helm et al.

Figure 4:
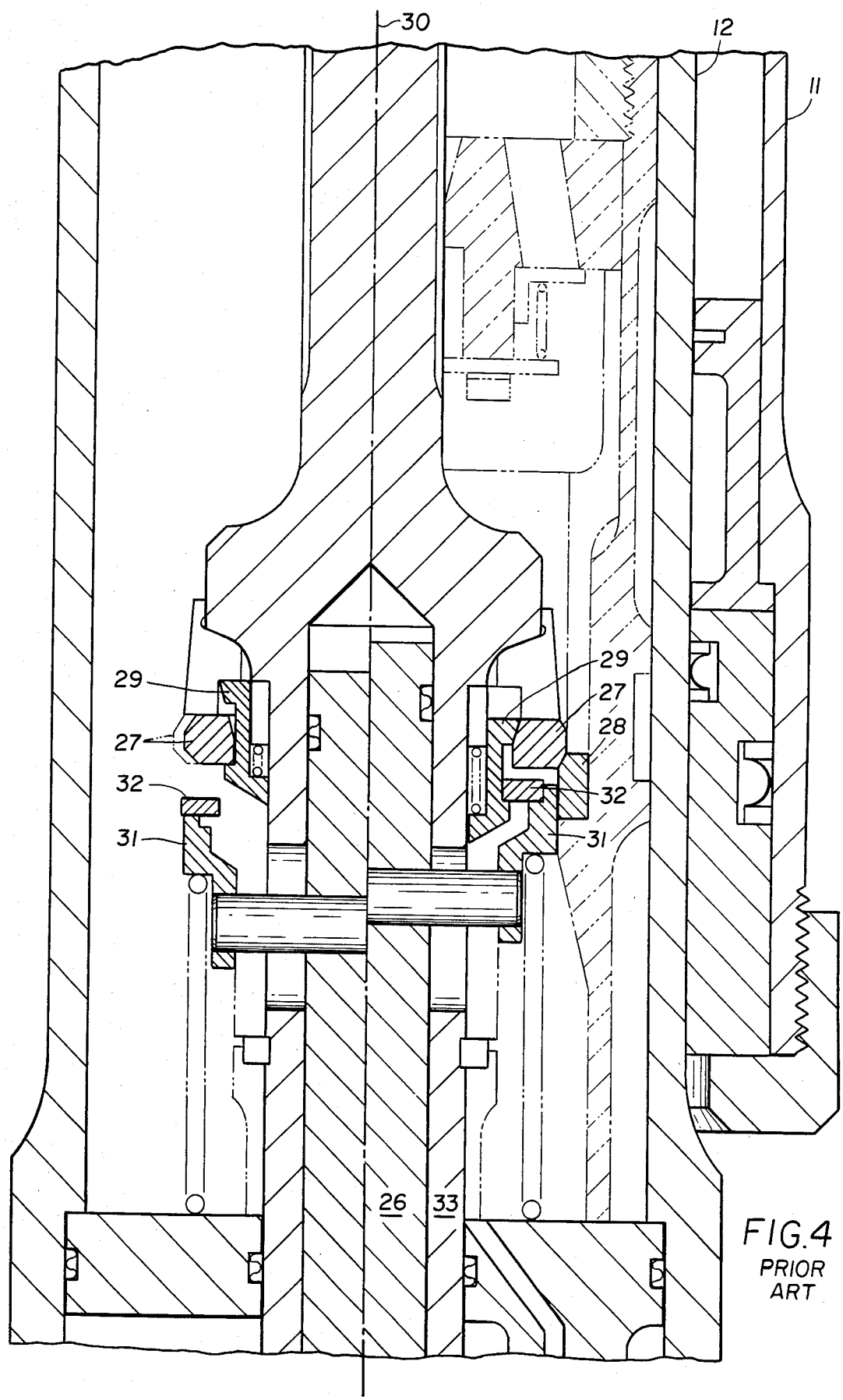
FIG. 4 is a cross-sectional view, on an enlarged scale, of the latching device in locked and unlocked positions.

The latching device comprises a main lock ring 27 (FIGS. 2A and 4) which is loaded against a conically shaped seat 28 by the strut axial load, as shown in FIGS. 2A and 4, when the latching device is locked. A load transfer sleeve 29 prevents the collapse of the lock ring 27 (FIGS. 2A and 4). The locked position of the latching device is shown to the right of line 30 in FIG. 4 and the released or unlocked position of said latching device is shown to the left of said line.

Figure 2B:
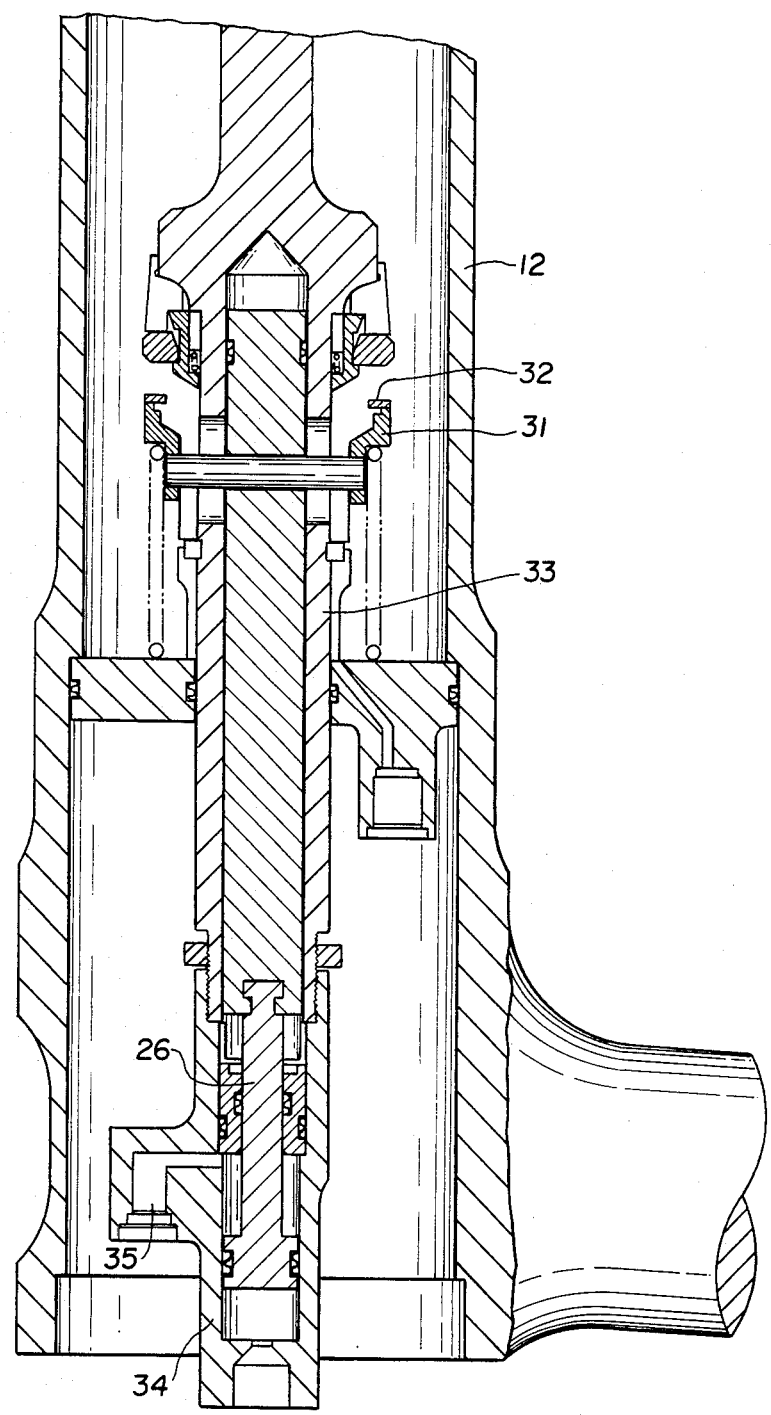
FIG. 2B is a view, partly in section, of part of the embodiment of FIG. 2A, in the unlatched condition, showing the metering pin of the telescopic shock strut of FIG. 2A.

When the airplane pilot introduces a hydraulic pressure increase which exceeds the spring load, it pulls the pin and load release sleeve 31 down (FIGS. 2A, 2B and 4). A downward motion of a load release sleeve 31 (FIGS. 2A, 2B and 4) permits a trigger ring 32 to expand, permitting the load transfer sleeve 29 to move upward due to the axial component of the loading on the lock ring 27, and against a reset spring. The upward movement of the load transfer sleeve 29 permits the collapse of the lock ring 27 and releases the metering pin 33 from the orifice and support 16 and thus the telescoping piston cylinder 12 from the upper cylinder 11, as shown in FIGS. 2B and 4. The lock rings 27 and 32 are split rings. The load release sleeve 31 is released by hydraulic pressure via a port 35 in orifice pin extension 34 (FIGS. 2A and 2B).

As shown in FIG. 2A, the check valve 15 of the metering chamber comprises a check or flapper valve biased by a spring 36 compressed between said valve and a port plate 37.

Figure 5:
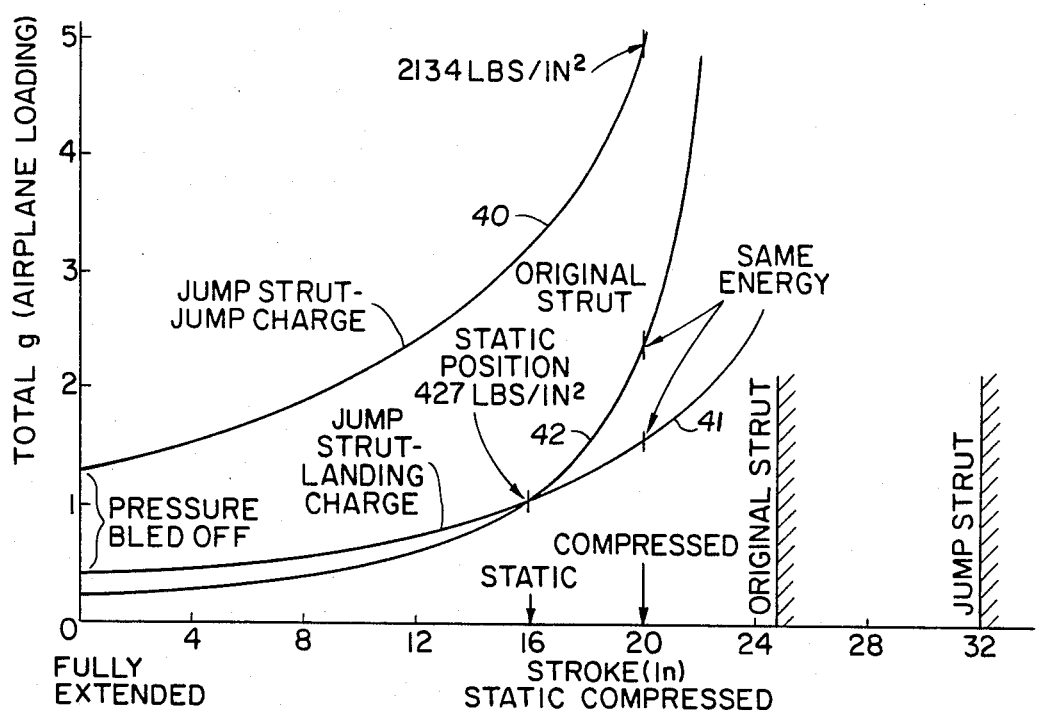
FIG. 5 is a graphical presentation of the airplane loading due to the pressurization of the telescopic, energy-dissipating shock strut with the jump strut feature of the invention and without.

FIG. 5 is a graphical presentation including an analytical evaluation for a main gear shock strut of the effect of the jump strut loading curve 40 on the airplane 1 due to the strut extension for jumping of the airplane from the runway 2 during a takeoff, and a comparison of airplane charge gas loading shown by curve 41 for stroking of the telescopic, energy-dissipating oleo main gear shock strut of this invention, after the jump stroke has been completed and the charge gas pressure bled off to the landing shock absorption level. This is compared with the charge gas loading of an original non-jumping strut in curve 42. A comparison of curves 41 and 42 shows that the gas charge at the end of the jump operation is suitable for the landing shock energy dissipation mode. In arriving at these results the following facts were known:

Airplane Gross Weight = 15,000 lbs
Main Gear Shock Strut,
 (a) Cylinder Area = 17.57 in.$^2$
 (b) Fully Compressed Gas Volume = 88.63 in.$^3$
 (c) Full Stroke = 20 in.
 (d) Stroke to Static Position = 16 in.
 (e) Desired Jump Vertical Velocity = 10.9 ft./sec.
Initial Load Limit to Airplane on Jumping = 5 g.

The selected gas charge pressure was 2134 lbs/in.$^2$, which is a value well within standard pneumatic charging equipment capacity for servicing an airplane. This pressurization, assuming a normal adiabatic expansion providing 80% useful fluid energy and that the wing propulsion lift is 15% less than the airplane weight at the main gear jump point, will provide the 10.9 ft/sec jump if the original strut volume is increased slightly to add 125.57 in$^3$ of volume. This volume can be provided by a 7.15 inch strut length increase or by a gas bottle 43 volume (FIG. 3) of such shape and location as further facilitates the landing gear system design.

Figure 6:
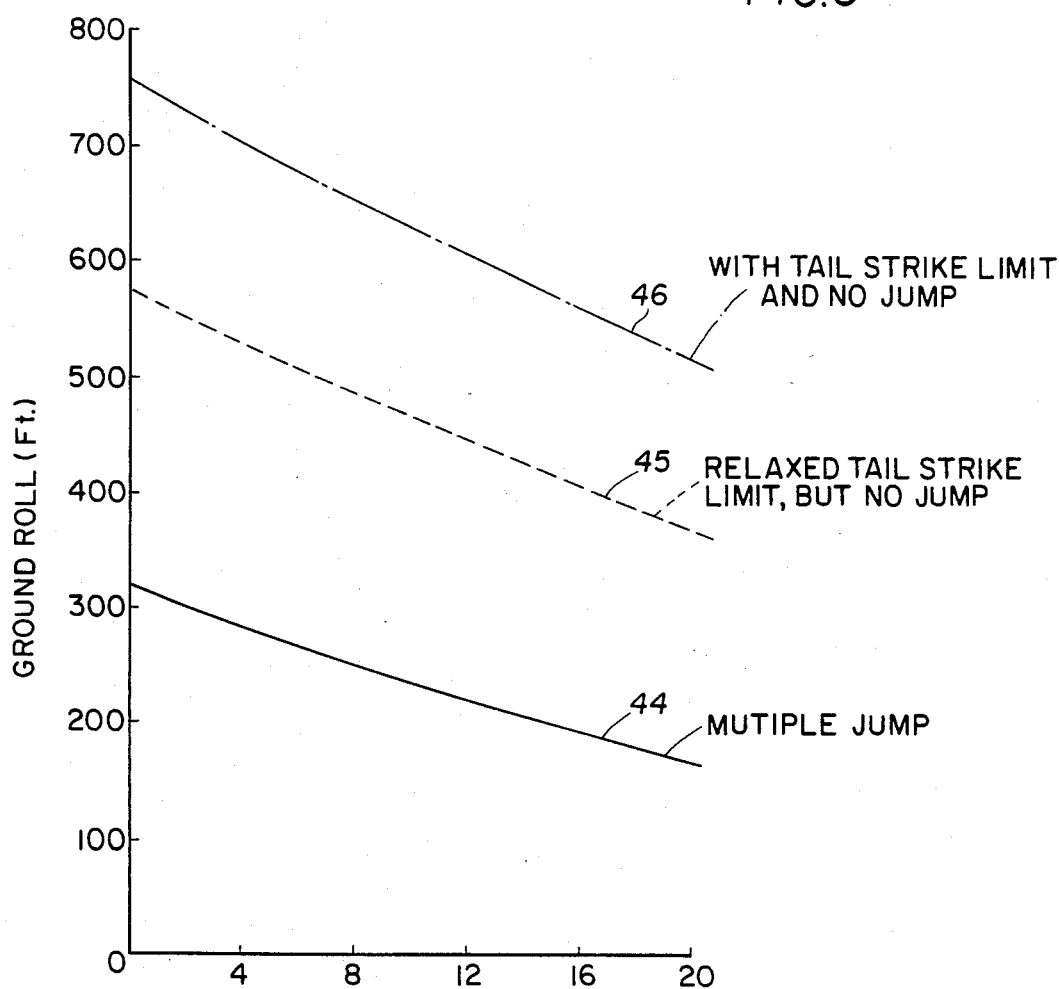
FIG. 6 is a graphical presentation of the ground roll at various wind speeds for takeoff of an airplane with the jump strut of the invention and without.

FIG. 6 graphically presents a comparison of the performance of an airplane with the present invention in curve 44 and the performance of the same airplane without the benefit of the present invention in curve 46. Curve 44 represents the required takeoff ground roll for various wind conditions for an airplane having a main gear jump takeoff airspeed of 77 kts. The nose gear is jumped first and, as the tail approaches the ground, the main gear is jumped, producing 10.9 ft/sec vertical velocity and providing clearance for the tail at the desired 16° angle of attack. Curve 45 represents the same airplane without the jump strut feature. It would take off at 103 kts if it could pitch up to 16° with conventional aerodynamic pitch control and if the landing gear and tail configuration would permit achieving this high angle before reaching 103 kts with the main wheels still on the ground. The airplane of the example, curve 46, which typifies modern design practice, cannot meet either of these requirements, but must accelerate to 119 kts airspeed where it can take off at 10° angle of attack. Thus, the present invention provides, for those skilled in the art, a significant takeoff performance benefit which, as shown in FIG. 6, can comprise a takeoff ground run reduction of approximately 60%.

Figure 7:
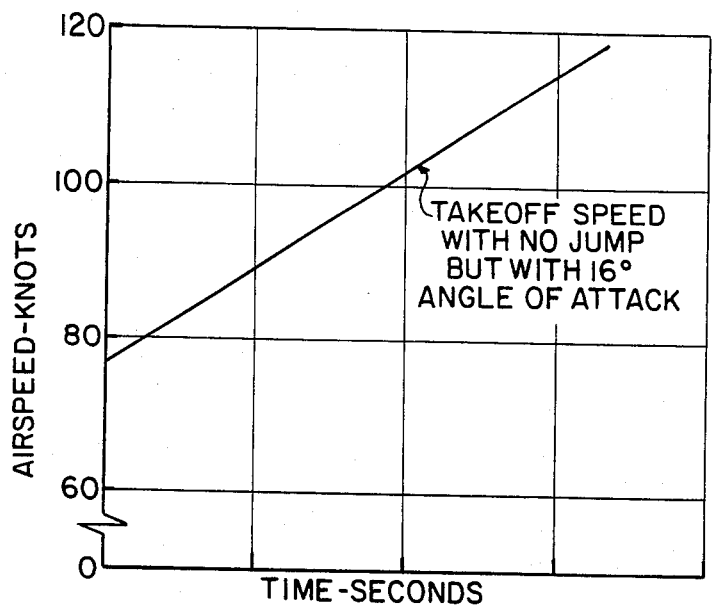
FIG. 7 is a graphical presentation of an airspeed time history of a jump takeoff.
Figure 8:
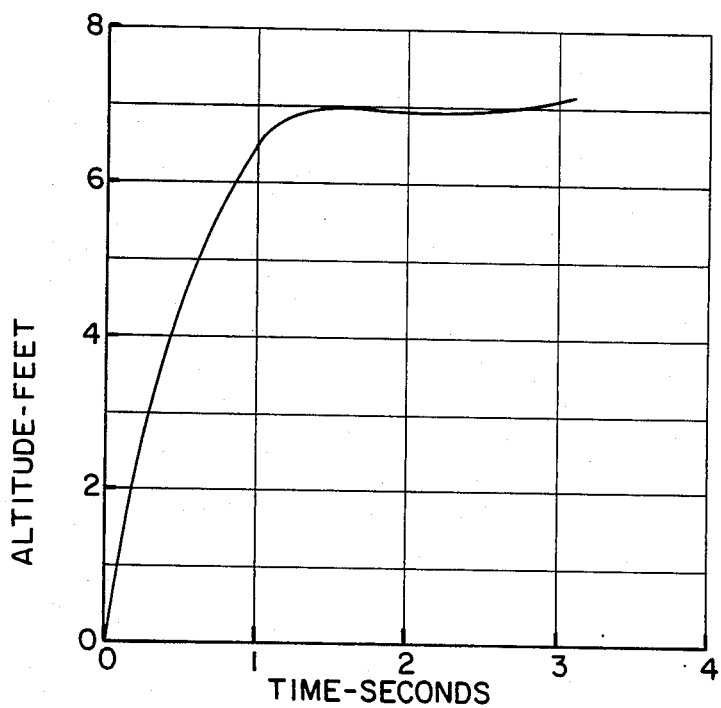
FIG. 8 is a graphical presentation of an attitude time history of a jump takeoff.

FIGS. 7 and 8 are graphical presentations of a time history airspeed and altitude of the jump starting with the point at which the main wheels leave the ground. These FIGS. clearly show that the climb rate starts to diminish rapidly and actually becomes a slightly negative value after the altitude of seven feet is first reached at 1.5 seconds. During this interval the airplane has gained an additional 19 kts of airspeed and is only 7 kts short of the 103 kts needed for steady flight. This brief shortage is the explanation for the mild reduction in altitude between 1.5 and 3.0 seconds.

The foregoing description indicates that the jump strut of the invention benefits the airplane takeoff by providing a high angle of attack, which may be beyond the angle limited by the tail striking the ground, while the airplane is at a low speed, and by launching the airplane in an initially upward trajectory which, as it curves downward toward the level flight, generates a generally upward centrifugal force to help sustain the airplane while it is gaining enough airspeed for steady level flight.

Figure 3:
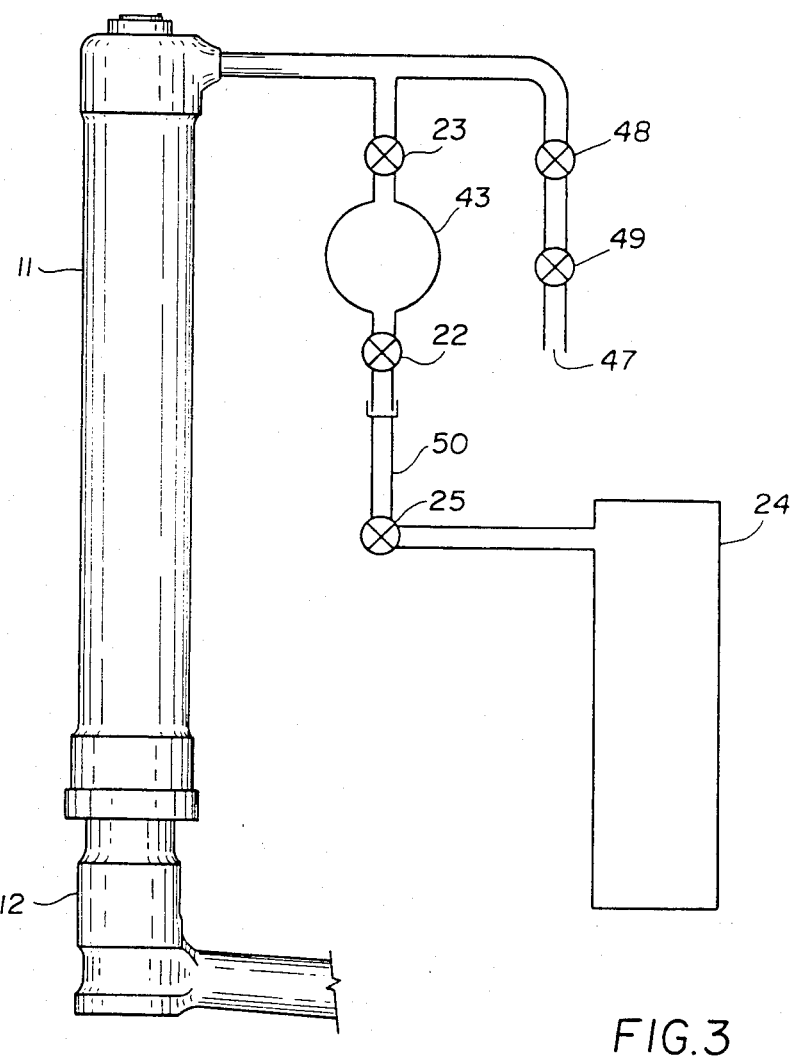
FIG. 3 is a schematic block diagram of an embodiment of the pressurization system of the shock strut of FIG. 2A.

To prepare for the jump, the struts are first bled to compress them by opening their fluid pressure chambers to a bleed port 47 via a reversion valve 48 and a relief valve 49 (FIG. 3). The strut collapses sufficiently, due to the static wheel load, to lock the piston cylinder 12 at its first predetermined locked position (FIGS. 2A, 2B and 4), so that the wheels 19, 20 and 21 are at the first predetermined distance from the aircraft 1 for normal takeoff.

The charging valve 22, the shut-off valve 23 and the valve 25 are opened and the portable high pressure tank 24 supplies the jump gas charge to the upper cylinder 11 with the additional volume of the bottle 43. The valves 25 and 22 are then closed and the tank 24 is disconnected from the airplane at the disconnect fitting 50.

In operation, it is necessary to sequence the jumping of the nose gear telescopic strut 3 and then the main landing gear telescopic struts 4 and 5 in a sequence which provides the desired high angle of attack with a low pitch rate. The nose strut latch is first released by its load release sleeve 31 and then the main landing gear system is unlatched by its load release sleeve 31. The main landing gear unlatch sequence is initiated by a probe 51 (FIG. 1) at the airplane tail, located so that it insures a high angle of attack, but that the tail does not strike the ground. As the piston cylinders 12 move downward, the pressure and spring bias on the valve 15 lessens to open a passage through the metering device to nullify orificing of oil, thus enhancing rapid extension of the strut during its jump stroke.

As soon as the jump stroke is complete, the extension pressure within the struts is returned to the normal shock absorber pressure, that is, reduced from 555 lbs/in$^2$ to 162 lbs/in$^2$ by the reversion valve 48 and the shut-off valve with appropriate pressure limits via the pressure relief valve 49, porting to the bleed port 47. The valve 23 may be closed to reduce the strut gas volume to a non-jump strut volume, if desired.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. A method of facilitating early takeoff of an airplane or, alternatively, increasing the payload of the airplane without increasing takeoff ground roll, said airplane having a telescoping, energy-dissipating oleo shock strut affixed to an extendible from the nose of said airplane, said method comprising the steps of restraining said shock strut in unenergized shortened condition;
   energizing said strut;
   accelerating said airplane from standstill;
   releasing said strut during the takeoff run acceleration of said airplane, whereby the energy of said strut extends said strut from said airplane and is dissipated thereby increasing the angle of attack of said airplane, causing an upward increase in lift which decreases gravity effect during acceleration of said airplane and shortens its takeoff roll; and
   immediately restoring the landing shock energy dissipation condition of said strut thereby immediately reinstituting the normal landing function of said strut.

2. A method of facilitating early takeoff of an airplane or, alternatively, increasing the payload of the airplane without increasing takeoff ground roll, said airplane having a telescoping, energy-dissipating oleo nose shock strut affixed to and extendible from the nose of said airplane and telescoping, energy-dissipating oleo main shock struts affixed to and extendible from said airplane, said method comprising the steps of latching said shock struts in their shortened condition;
   pressurizing the interiors of said shock struts while they are latched;
   accelerating said airplane from standstill to a predetermined velocity;
   unlatching said nose shock strut during takeoff run acceleration of said airplane, whereby the internal pressure of said nose strut extends said nose strut from said airplane and is dissipated, thereby increasing the angle of attack of said airplane, causing an upward increase in lift which decreases gravity effect during acceleration of said airplane and shortens its takeoff roll;
   immediately restoring the landing shock energy dissipation condition of said nose strut thereby immediately reinstituting the normal landing function of said nose strut;
   unlatching said main shock struts after rotation of said airplane whereby the energy of said main struts extends said main struts from said airplane and is dissipated thereby pushing said airplane upward, causing a trajectory which decreases gravity effect during acceleration of said airplane and further shortens its takeoff roll; and
   immediately restoring the landing shock energy dissipation condition of said main struts after lift-off of said airplane thereby immediately reinstituting the normal landing function of said main struts.

3. A method of facilitating a short takeoff roll for an airplane or, alternatively, increasing the payload of the airplane without increasing takeoff ground roll, said airplane having a telescoping, energy-dissipating oleo nose shock strut affixed thereto and extendible from the nose of said airplane and telescoping, energy-dissipating oleo main shock struts affixed to and extendible from said airplane, said struts having compressed gas therein and landing wheels mounted on the free ends thereof, said method comprising the steps of bleeding gas from said shock struts to collapse them;
   latching said shock struts in their shortened attitude;
   supplying compressed fluid to said shock struts;
   accelerating said airplane to begin its takeoff run;
   releasing the latching of said nose shock strut thereby providing a maximum extension of said nose strut and dissipating the pressure, thereby increasing the angle of attack of said airplane to effect a rotation of the wind velocity vector to permit an upward increase in lift and decreased gravity effect with sufficient balance to shorten the takeoff roll of said airplane;
   immediately restoring the landing shock energy dissipation condition of said nose strut thereby immediately reinstituting the normal landing function of said nose strut;

sensing the reaching of a predetermined angle of attack by said airplane;

releasing the latching of said main shock struts upon the sensing of said predetermined angle of attack whereby the energy of said main struts extends said main struts from said airplane and is dissipated thereby pushing said airplane upward, causing a trajectory which decreases gravity effect during acceleration of said airplane and further shortens its takeoff roll; and immediately restoring the landing shock energy dissipation condition of said main struts after lift-off of said airplane thereby immediately reinstituting the normal landing function of said main struts.

4. A method of rotating an airplane early in the takoff ground run to a high angle of attack which provides lift for early takeoff or, alternatively, increasing the payload of the airplane without increasing takeoff ground roll, said airplane having a telescoping, energy-dissipating oleo shock strut affixed to and extendible from said airplane at a forward position of said airplane, said method comprising the steps of bleeding gas from said strut to collapse it;

restraining said strut in an unenergized shortened condition;

energizing said strut with compressed gas;

releasing said strut during the takoff ground run whereby the energy of said strut extends said strut from said airplane and is dissipated thereby jumping the nose of said airplane upward, increasing the angle of attack at a point in the takeoff ground run where there is insufficient speed to achieve rotation by conventional pitch control means; and immediately restoring the landing shock energy dissipation condition of said strut thereby immediately reinstituting the normal landing function of said strut.

5. A method of providing a shortened takeoff ground run or a payload increase without an increase in takeoff ground run of an airplane, said airplane having a propulsion system, a telescoping, energy-dissipating oleo forward shock strut affixed to and extendible from said airplane at a forward portion of said airplane and telescoping, energy-dissipating oleo center shock struts affixed to and extendible from said airplane near the center of gravity of said airplane, said method comprising the steps of bleeding gas from said shock struts to collapse them;

restraining said shock struts in an unenergized shortened condition;

energizing said struts with compressed gas;

releasing said forward strut during the takeoff ground run whereby the energy of said forward strut extends said forward strut from said airplane and is dissipated thereby jumping the nose of the airplane upward and increasing the angle of attack of said airplane to cause an increase in lift and counteracting gravity effect;

immediately restoring the landing shock energy dissipation condition of said forward strut thereby immediately reinstituting the normal landing function of said forward strut;

sensing the reaching of a predetermined angle of attack by the airplane;

subsequently releasing said center struts upon the sensing of said predetermined angle of attack after the nose-up rotation of said airplane whereby subsequently the energy of said center struts extends said center struts from said airplane and is dissipated thereby pushing said airplane upward, resulting in an initially upward, downwardly curved, trajectory which produces a generally upward centrifugal force, said trajectory being defined by a continuously diminishing gravity effect due to the sum of any thrust lift, the increasing wind lift and the substantial horizontal acceleration provided by the propulsion system of said airplane, so that said airplane does not return to earth and there is a substantial reduction in the takeoff ground run; and immediately restoring the landing shock energy dissipation condition of said center struts after lift-off of said airplane thereby immediately reinstituting the normal landing function of said struts.

6. A method as claimed in claim 5, wherein energy is dissipated from said forward and center struts by venting off residual pressurizing gas as necessary after jumping of said struts to provide the proper gas charge for the landing shock absorption function.

7. A jump strut device for facilitating early takeoff of an airplane or, alternatively, increasing the payload of the airplane without increasing takeoff ground roll, said airplane having a telescoping, energy-dissipating oleo shock strut affixed to and extendible from the nose area of said airplane, said device comprising latching means for latching said shock strut in its shortened condition;

pressure means for pressurizing the interior of said shock strut while it is latched;

release means for unlatching said latching means during takeoff run acceleration of said airplane, whereby the internal pressure of said strut extends said strut from said airplane and is dissipated, thereby pushing said airplane upward and increasing the angle of attack of said airplane, causing an increase in lift and a decrease in gravity effect during acceleration of said airplane and shortening its takeoff roll; and restoring means for immediately restoring the landing shock energy dissipation condition of said strut thereby immediately reinstituting the normal landing function of said strut.

8. A jump strut device as claimed in claim 7, wherein said shock strut includes an upper cylinder affixed to said airplane and an extendible piston cylinder coaxially slidably mounted in said upper cylinder for movement in axial directions, said piston cylinder having a free end farthest from said airplane and mounting a landing wheel of said airplane in a manner whereby said wheel is at a first predetermined distance from said airplane when said shock stut is in shortened condition and is at a second predetermined maximum distance from said airplane when said shock strut is in extended condition.

9. A jump strut device as claimed in claim 8, wherein said pressure means comprises a source of compressed fluid and valve means for selectively controlling the flow of said fluid to said upper cylinder thereby controlling the axial position of said piston cylinder and,, accordingly, the distance between said landing wheel and said airplane.

10. A jump strut device as in claim 8, wherein said fluid includes hydraulic fluid and gas under pressure.

11. A jump strut device as claimed in claim 8, wherein said strut further includes an orifice, an orifice support tube coaxially positioned in said piston cylinder and a metering pin in said piston cylinder coaxially slidably mounted in said orifice support tube and said orifice, and said pressure means comprises a source of compressed fluid and a check valve which permits fluid to bypass said orifice when said piston cylinder is moving away from said airplane but limits fluid to flow through said orifice when said piston cylinder is moving toward said airplane.

12. A jump strut device as claimed in claim 8, wherein said shock strut further includes an orifice, an orifice support tube coaxially positioned in said piston cylinder and a metering pin in said piston cylinder coaxially slidably mounted in said orifice support tube and said orifice, and said release means comprises a load release sleeve coaxially positioned with and abutting part of said latching means when said latching means is locked, said load release sleeve maintaining said metering pin in locked position in said orifice support tube and, when moved, permitting said part of said latching means to expand, thereby permitting another part of said latching means to collapse and releasing said metering pin to release said latching means from its locked position.

13. A jump strut device as claimed in claim 12, wherein said latching means comprises a lock ring, intermediate latch parts, a load release sleeve coaxially positioned with said intermediate latch parts so that said lock ring is maintained in a radially expanded condition which locks said metering pin and said piston cylinder to said orifice support tube and said upper cylinder, axial movement of said load release sleeve permitting said intermediate latch parts to move so that said lock ring contracts radially, releasing said metering pin and said piston cylinder from said orifice support tube and said upper cylinder.

14. A jump strut device as claimed in claim 13, wherein said strut further includes a valve for bleeding off residual gas after the jumping of said airplane and a valve for supplying high pressure gas to said strut.

15. A jump strut device for facilitating early takeoff of an airplane or, alternatively increasing the payload of the airplane without increasing takeoff ground roll, said device comprising a telescoping, energy-dissipating oleo shock landing gear strut having an upper cylinder for hydraulic fluid affixed to and extendible from the area of the nose of said airplane and a piston cylinder coaxially mounted in said upper cylinder for movement in axial directions and mounting a wheel of said airplane thereon;

latching means for locking said piston cylinder at a first predetermined position in said upper cylinder to maintain said wheel and said airplane at a first predetermined distance from each other for normal takeoff and landing operation; and control means including pressure means for controlling the flow and pressure of fluid in said upper cylinder thereby to control the axial position of said piston cylinder in said upper cylinder and the distance between said wheel and said airplane, for releasing said piston cylinder thereby permitting the pressure of fluid in said upper cylinder to move said piston cylinder and said wheel to second predetermined positions at which they and said airplane are farther away from each other and then to dissipate whereby the angle of attack of said airplane is increased to effect an increase of lift and a lessening of gravity effect while the velocity of said airplane is increasing to effect takeoff after a shortened roll distance without settling of said airplane toward the ground, and for immediately restoring the landing shock energy dissipation condition of said strut thereby immediately reinstituting the normal landing function of said strut.

16. A jump strut device for facilitating early takeoff of an airplane or, alternatively, increasing the payload of the airplane without increasing takeoff ground roll, said airplane having a telescoping, energy-dissipating oleo nose shock strut affixed to and extendible from the nose of said airplane and telescoping, energy-dissipating oleo main shock struts affixed to and extendible from said airplane, said device comprising latching means for latching said shock struts in their shortened condition;

pressure means for pressurrizing the interior of said shock struts while they are latched;

release means for unlatching said latching means during takeoff run acceleration of said airplane, whereby the internal pressure of said nose strut extends said nose strut from said airplane and is dissipated thereby increasing the angle of attack of said airplane, causing an upward increase in lift and a decrease in gravity effect during acceleration of said airplane and shortening its takeoff roll;

restoring means for immediately restoring the landing shock energy dissipation condition of said nose strut thereby immediately reinstituting the normal landing function of said nose strut;

sensing means at the tail of said airplane for sensing the reaching of a predetermined angle of attack by said airplane;

release means for unlatching said main shock struts upon the sensing of said predetermined angle of attack, whereby the internal pressure of said main struts extends said main struts from said airplane and is dissipated thereby pushing said airplane upward, causing a trajectory which decreases gravity effect during acceleration of said airplane and further shortens its takeoff roll; and restoring means for immediately restoring the landing shock energy dissipation condition of said main struts after lift-off of said airplane thereby immediately reinstituting the normal landing function of said main struts.

17. A jump strut device as claimed in claim 16, wherein each of said shock struts includes an upper cylinder affixed to said airplane and an extendible piston cylinder coaxially slidably mounted in said upper cylinder for movement in axial directions, said piston cylinder having a free end farthest from said airplane and mounting a landing wheel of said airplane in a manner whereby said wheel is at a first predetermined distance from said airplane when said shock strut is in shortened condition and is at a second predetermined maximum distance from said airplane when said shock strut is in extended condition.

18. A jump strut device as claimed in claim 12, wherein said pressure means comprises a source of compressed fluid and valve means for selectively controlling the flow of said fluid to said upper cylinder thereby controlling the axial position of said piston cylinder and, accordingly, the distance between said landing wheel and said airplane.

19. A jump strut device as claimed in claim 18 wherein said fluid includes hydraulic fluid and gas under pressure.

20. A jump strut device as claimed in claim 17, wherein each of said shock struts further includes an orifice support tube coaxially positioned in said piston cylinder and a metering pin in said piston cylinder coaxially slidably mounted in said orifice support tube, and said release means comprises a load release sleeve coaxially positioned with and abutting part of said latching means when said latching means is locked, said load release sleeve maintaining said metering pin in locked position in said orifice support tube and, when moved, permitting said part of said latching means to expand, thereby permitting another part of said latching means to collapse and releasing said metering pin to release said latching means from its locked position.

21. A jump strut device as claimed in claim 17, wherein each of said struts further includes an orifice support tube coaxially positioned in said piston cylinder and a metering pin in said piston cylinder coaxially slidably mounted in said orifice support tube and said pressure means comprises a source of compressed fluid and a check valve which permits fluid to bypass said orifice when said piston cylinder is moving away from said airplane but limits fluid to flow through said orifice when said piston cylinder is moving toward said airplane.

* * * * *